1,682,825

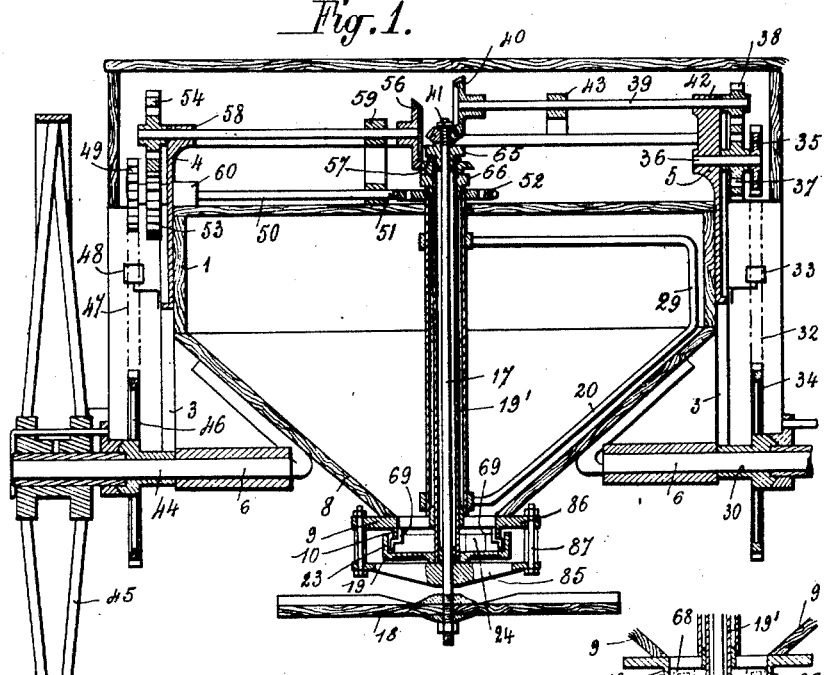
Sept. 4, 1928.
R. BERGERIOUX
1,682,825
MACHINE FOR DISTRIBUTING FERTILIZER, SEEDS, AND GRAIN
Filed Aug. 19, 1925   2 Sheets-Sheet 1
INVENTOR
RENÉ BERGERIOUX
BY
ATTORNEYS Sept. 4, 1928. 1,682,825
R. BERGERIOUX
MACHINE FOR DISTRIBUTING FERTILIZER, SEEDS, AND GRAIN
Filed Aug. 19, 1925 2 Sheets-Sheet 2
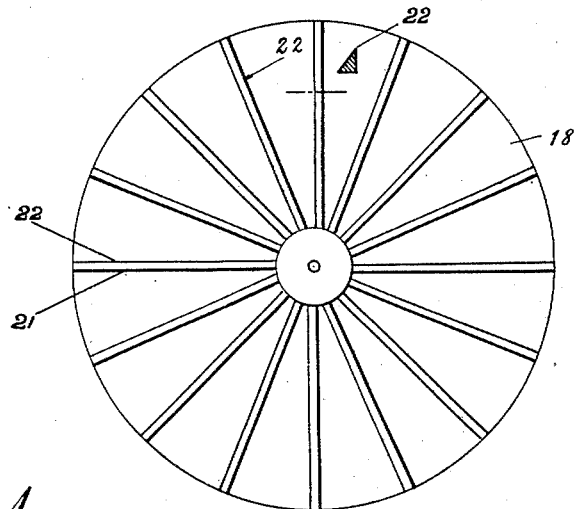
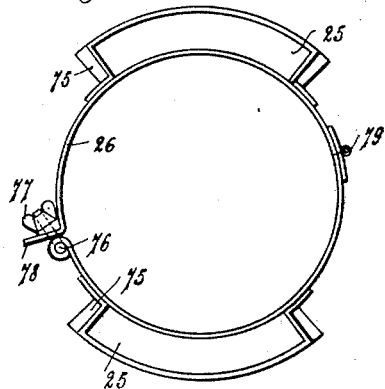
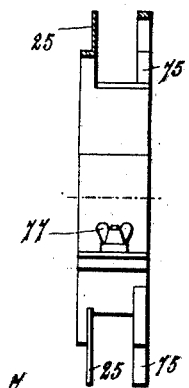
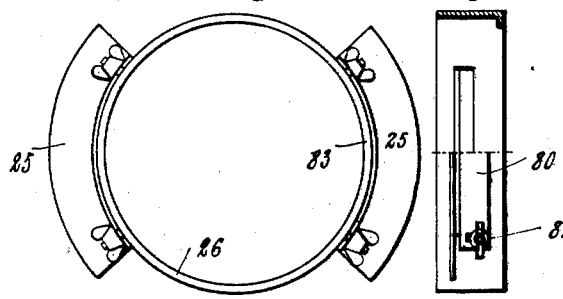
INVENTOR
RENÉ BERGERIOUX
BY
ATTORNEYS Patented Sept. 4, 1928.

UNITED STATES PATENT OFFICE.

RENÉ BERGERIOUX, OF ISSOUDUN, FRANCE.

MACHINE FOR DISTRIBUTING FERTILIZER, SEEDS, AND GRAIN.

Application filed August 19, 1925, Serial No. 51,080, and in France December 19, 1924.

The known feeding apparatus for fertilizer may be divided into two general classes; firstly, devices in which the feeding element spreads the fertilizer by the action of centrifugal force, and secondly, devices having a movable bottom and in which the feeding is effected by a hedgehog element.

In the first class of devices, the fertilizer is spread upon a considerable width, but since the feeding element operates within fertilizer it will rapidly wear out, whence a great cost of upkeep.

The second class of devices spread the substance upon a less width, and they require a great force of traction; the space occupied exceeds the width upon which the fertilizer is distributed, and the mechanism also operates within the substance of the fertilizer. A damp substance will clog up the hedgehog element, and such apparatus are unsuitable for granular substances such as cyanamide and the like.

As concerns grain or seed sowing machines, numerous types of such machines are in use whereof the principal drawback consists in their great size and small output.

All of the aforesaid inconveniences are obviated in the apparatus according to my present invention, whose leading features are the small size of the feeding device for fertilizer, grain or seed; by the great width of the distribution which is analogous to that of the first-mentioned type; by the reduced force of traction required; by the nature of the mechanism which now operates entirely outside of the substance to be distributed and can be readily lubricated; and by its reduced weight which enables its use even among growing crops for the distribution of fertilizer.

I am further enabled to make use of a single apparatus for the feeding or spreading of fertilizer, grain and seed, two apparatus being needed as a rule for this purpose in the known methods.

By way of example, the appended drawings show various constructional forms of my said feeding apparatus.

Fig. 1 is a vertical section on the axis of the wheels of the apparatus.

Fig. 2 is a side view with one-half in section.

Fig. 3 is a plan view.

Figs. 4 and 5 are respectively plan and elevational views of a sleeve for feed regulation where powdered fertilizer is employed.

Figs. 6 and 7 are views analogous to the preceding in the case of grain, seed and granular fertilizer.

Fig. 8 is a modified form of the feeding element.

My said feeding device comprises a stationary recipient 1, preferably of rectangular shape, without bottom and with or without lateral loading doors or flaps, it being provided at the upper part with two supports 4 and 5 carrying the respective shafts as well as the cross-pieces 63 and 64. The recipient 1 is mounted on the vehicle axle 6 by means of the straps 3, and has extending therefrom the wagon poles 7 which are attached in a suitable manner.

Instead of a rectangular shape, the recipient 1 may have a circular shape, or any suitable cross-section, or it may comprise a circular or other recipient mounted in a rectangular frame and secured thereto in an adequate manner.

To the lower part of the recipient 1 is secured a tapered vessel forming a funnel or hopper 8 whose lower aperture is covered by a member 9 having a hollow cylindrical central portion 10 which enters the feeding device but without contact therewith. Below the member 9 are disposed one or more forks 68 for breaking up the lumps and also one or more scraping members or hooks 69 which are arranged at intervals about the interior of the member 10 and disposed close to the lateral edges of the vessel 23, said scraping members also acting to break up lumps in the material.

The cross-pieces 63 and 64 support the central bearing 65 forming a shaft bearing, and a lower central bearing 66 also forming a shaft bearing, which is connected with the bearing 65 by the cross-pieces 67 or in like manner. At the centre of the member 9 is disposed a central bearing 84 and a lower central bearing 85 which is connected with two lugs 86 of the member 9 by the cross-pieces 87 or in like manner. The central shaft 17 is rotatable in bearings 65 and 85 and has its lower end projecting below the latter bearing with the separating or scattering element 18 mounted upon said lower end.

The strewing element 18 (Fig. 3) preferably comprises the triangular radial arms 21 having sharp upper edges 22, said arms being connected together at the ends by a peripheral member.

The feeding element 19, mounted on the lower end of the shaft 19', consists of a circular vessel 23 having various slots 24 in its upper cylindrical periphery. On the bottom 72 of said vessel are mounted one or more vertical rods 73 adapted to move within the forks 68 of the member 9 when the said feeding element operates. Around the exterior of the vessel 23 is a movable sleeve 26 (Figs. 4 to 7) which is supported by the lugs 71 of said vessel. In the said sleeve are formed one or more apertures which will more or less close the slots 24 and thus regulate the feed.

Upon the sleeve 26 are mounted one or more plates or screens 25 serving to prevent the too rapid descent of the feeding substance. Upon each shield 25 is placed a hollow cap 75 assuring the rigidity of said sleeve. The latter is attached to the vessel 23 by means of a pivoting screw 76 with nut 77 pressing upon an angle portion 78, or by like means, said sleeve consisting preferably of two half-collars (with or without apertures as desired) which are connected together by a hinge 79; one collar carries the screw 76 and the other the angle part 78. In this manner the sleeve can be mounted or removed at once.

For use with grain, seeds or granulated fertilizer (Figs. 6 and 7) each aperture in the sleeve can be more or less closed by an outer sliding plate 80 which is maintained upon the sleeve by wing nuts cooperating with slots 82 in the said plates. A circular edge 83 serves to take up the distance between the vessel 23 of the feeding element 19 and the part 10 of the member 9; this edge is not in contact with the part 10 but it prevents the exit of the substance otherwise than through the slots. Obviously, the number of slots 24 in the feeding element 19 may be as desired, the sleeve 26 being apertured in consequence, and suitable recesses or like means indicating the adjustment may be provided upon the outer periphery of the feeding vessel 23.

In the modification shown in Fig. 8, the feeding element comprises a lower disk 84 mounted on the shaft 19'. The lower part 10 of the member 9 is surrounded by a collar 85 which can be more or less raised in order to allow the requisite height between the bottom of the member 10 and the disk 84, this varying with the nature of the product and te amount of the feed; said collar is imperforate, and consists of two parts hinged together, it being fastened to the part 10 by uniting the two parts by a screw whose disposition resembles what is shown in Fig. 4. I may further provide all suitable means for indicating the adjustment; herein the forks 68 and the rods 73 will be maintained, but the scrapers 69 are eliminated.

The stirring element consists of a frame 29 having the same shape as the inner outline of the recipient 1 and the hopper 8, but without touching the same. I may obviously provide a plurality of stirrers 29 in the apparatus, and their frames will be disposed in any suitable manner.

In the feeding device herein represented the strewing or spreading element rotates in the contrary direction to the feeding device and the stirrer, but it is evident that I may employ all suitable combinations as regards the rotation of these three movable parts. So also, since each part is to rotate at a different speed, I provide adequate speed-reducing means in accordance with usual practice.

The various movements of the said elements are obtained by driving them from the vehicle wheels. The shaft 30 of one vehicle wheel 31 drives—by means of the wheel 34, the chain 32 and the adjustable stretching roller 33—the wheel 35 which is loose on an axle 36 secured to the machine frame.

The wheel 35 is secured to a pinion 37 engaging the gear wheel 38 keyed to a shaft 39 at whose other end is mounted a level gear 40 engaging the pinion 41 on the shaft of the strewing device. The shaft 39 is rotatable in the bearings 42 and 43; the bearing 42 is secured to the support 5 and the bearing 43 is mounted on the cross-pieces 63 and 64. The shaft 44 of the other vehicle wheel 45 drives—through the wheel 46 and the chain 47 provided with the stretching roller 48—a wheel 49 keyed to the shaft 50 upon one end of which is formed the worm 51 adapted to drive the worm wheel 52 of the hollow shaft of the stirrer.

The wheel 49 is secured to a second gear wheel 53 engaging a gear wheel 54 mounted on a shaft 55 whose other end carries a pinion 56 engaging the pinion 57 mounted on the hollow shaft of the feeding element. The shaft 56 is mounted in the bearings 58 and 59; the bearing 58 forms part of the support 4 and the bearing 59 is mounted on the cross-pieces 63 and 64. The bearing 59 is made double and also carries the shaft 50 which is journaled at the other end in a bearing 60 mounted on the support 4. A bearing brass may be disposed at the end of the bearing 66 to hold the shaft 50 against bending.

I further provide ball bearings (comprising thrust bearings) as well as protecting casings wherever needed upon the apparatus.

Lubrication is effected from the upper part in such manner that all the moving parts will constantly operate in an oil bath. The mechanism is started and stopped by suitable clutching means.

A screen 62 is disposed at the front part of the said recipient and at the lower part of the apparatus in order to regulate the strewing action so as to avoid all interference with the draught arrangements of the vehicle.

I claim:

1. A machine for distributing fertilizer, seeds and grain, including a container, a plurality of shafts extending through said container and arranged concentrically one within another, a gear train for driving said shafts independently of each other, a stirrer in said container rotated by one of said shafts, a distributor operated by another of the shafts, and a horizontal projector actuated by the remaining shaft.

2. A machine in accordance with claim 1, characterized in that said distributor is interposed between said container and projector and includes a rotating reservoir having a plurality of slots in its periphery, a cover for said slots having apertures therein adapted to align with said slots, and lump breakers within said reservoir.

3. A machine in accordance with claim 1, characterized in that said distributor is interposed between said container and projector and includes a rotating reservoir having a plurality of slots in its periphery, a cover for said slots having apertures therein adapted to align with said slots, a perforated bottom for said container, lump breakers including forks carried by said bottom, and vertical rods carried by said reservoir and cooperating with said forks.

4. A machine in accordance with claim 1, characterized in that said distributor is interposed between said container and projector and includes a rotating reservoir having a plurality of slots in its periphery, a cover for said slots having apertures therein adapted to align with said slots, lump breakers within said reservoir, lugs formed on said reservoir to removably support said cover in position relative to the reservoir, and a plate extending from each of the apertures in said cover to prevent the too rapid descent of the material being distributed.

5. A machine in accordance with claim 1, characterized in that said distributor is interposed between said container and projector and includes a rotating reservoir having a plurality of slots in its periphery, a cover for said slots having apertures therein adapted to align with said slots, lump breakers within said reservoir, lugs formed on said reservoir to removably support said cover in position relative to the reservoir, a plate extending from each of the apertures in said cover to prevent the too rapid descent of the material being distributed, a sliding plate for opening and closing each of the apertures in said cover, and wing nuts for securing said plates in position.

Signed at Paris, in the department of Seine and State of France this third day of August, 1925.

RENÉ BERGERIOUX.